United States Patent [19]

Saotome

[11] Patent Number: 5,151,596
[45] Date of Patent: Sep. 29, 1992

[54] METHOD AND APPARATUS FOR DETECTING THE LOCATION OF A PATTERN IN A RADIATION IMAGE STORED ON A STIMULABLE PHOSPHOR SHEET

[75] Inventor: Shigeru Saotome, Kanagawa, Japan

[73] Assignee: Fuji Photo Film Co., Ltd., Kanagawa, Japan

[21] Appl. No.: 676,590

[22] Filed: Mar. 28, 1991

[30] Foreign Application Priority Data

| Mar. 28, 1990 | [JP] | Japan | 2-80020 |
| Mar. 28, 1990 | [JP] | Japan | 2-80022 |
| Mar. 28, 1990 | [JP] | Japan | 2-80023 |

[51] Int. Cl.⁵ ............................................. G01N 23/04
[52] U.S. Cl. .................................................. 250/327.2
[58] Field of Search ........................ 250/327.2, 484.1

[56] References Cited

U.S. PATENT DOCUMENTS

| 4,258,264 | 3/1981 | Kotera et al. | 250/484.1 |
| 4,276,473 | 6/1981 | Kato et al. | 250/327.2 |
| 4,315,318 | 2/1982 | Kato et al. | 250/337 |
| 4,387,428 | 6/1983 | Ishida et al. | 250/337 |
| 4,703,537 | 11/1987 | Yamamoto et al. | 15/102 |
| 4,774,409 | 9/1988 | Yamamoto et al. | 250/327.2 |

FOREIGN PATENT DOCUMENTS

| 56-11395 | 2/1981 | Japan . | |
| 165641 | 8/1985 | Japan | 250/327.2 A |
| 60-258534 | 12/1985 | Japan . | |
| 62-8938 | 1/1987 | Japan . | |
| 62-246041 | 10/1987 | Japan . | |
| 63-34531 | 2/1988 | Japan . | |
| 63-37340 | 2/1988 | Japan . | |
| 63-213835 | 9/1988 | Japan . | |
| 63-259546 | 10/1988 | Japan . | |

*Primary Examiner*—Carolyn E. Fields
*Attorney, Agent, or Firm*—Sughrue, Mion, Zinn, Macpeak & Seas

[57] ABSTRACT

A radiation image read-out apparatus comprises a device for irradiating stimulating rays to a stimulable phosphor sheet, on which a radiation image has been stored. The stimulating rays cause the stimulable phosphor sheet to emit light in proportion to the amount of energy stored thereon during its exposure to radiation. A first photoelectric conversion device photoelectrically detects the emitted light and generates an image signal representing the radiation image. A second photoelectric conversion device photoelectrically detects the stimulating rays, which have been reflected from the stimulable phosphor sheet, and thereby generates a monitor signal. From the monitor signal, a detection device detects location of a pattern caused to occur in the radiation image, which is represented by the image signal, by dust clinging to the stimulable phosphor sheet.

9 Claims, 9 Drawing Sheets

METHOD AND APPARATUS FOR DETECTING THE LOCATION OF A PATTERN IN A RADIATION IMAGE STORED ON A STIMULABLE PHOSPHOR SHEET

BACKGROUND OF THE INVENTION

1. Field of the Invention

This invention relates to a radiation image read-out apparatus wherein a radiation image, which has been stored on a stimulable phosphor sheet, is read out from the stimulable phosphor sheet, and an image signal representing the radiation image is thereby obtained. This invention particularly relates to a radiation image read-out apparatus, which has a function for detecting the location of a pattern in the radiation image, which pattern corresponds to dust clinging to the stimulable phosphor sheet. This invention also relates to a method for displaying a radiation image, wherein a visible image is reproduced from an image signal, which has been obtained by detecting light emitted by a stimulable phosphor sheet, on which a radiation image has been stored, in proportion to the amount of energy stored thereon during its exposure to radiation.

2. Description of the Prior Art

When certain kinds of phosphors are exposed to radiation such as X-rays, a-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In the radiation image recording and reproducing systems which use stimulable phosphor sheets, if dust clings to part of the surface of a stimulable phosphor sheet, the image information at said part will be lost in a visible image reproduced from an image signal, which has been detected from the stimulable phosphor sheet. Additionally, the pattern corresponding to dust and information in the radiation image, which information is related to a diagnosis, or the like, cannot be discriminated from each other. Therefore, an accurate judgment, e.g. an accurate diagnosis of an illness, cannot be made from the visible image.

For example, an X-ray image of the mamma of a human body is stored on a stimulable phosphor sheet, and an electric signal representing the X-ray image is detected from the stimulable phosphor sheet. The X-ray image is then reproduced as a visible image from the electric signal and displayed on a CRT display device, or the like. A diagnosis is then made from the visible image or to whether the human body does or does not have mammary cancer. In cases where the human body has mammary cancer, white dot-like patterns, which correspond to calcified parts and have a diameter of approximately 300 $\mu$m, appear in the X-ray image. Therefore, by way of example, the diagnosis is made based on the presence or absence, the number, the density, or the like, of such white dot-like patterns appearing in the X-ray image. However, in cases where dust clings to the stimulable phosphor sheet, patterns corresponding to the dust also appear as white dots in the visible image which is reproduced from the image signal detected from the stimulable phosphor sheet. It is difficult for the patterns corresponding to the dust to be discriminated from the patterns corresponding to the calcified parts. Accordingly, there is the risk that, even if no calcified part is present in the human body, the human body is diagnosed incorrectly as having mammary cancer.

By way of example, non-luminescent impurities are often included in the stimulable phosphor, which is used as a raw material for constituting the stimulable phosphor layer of a stimulable phosphor sheet. Also, dust is often included in the stimulable phosphor layer in the course of making a stimulable phosphor sheet. In such cases, small defects, which cannot be eliminated by cleaning, or the like, will occur on the surface or in the interior of the stimulable phosphor sheet obtained as a final product. In such cases, the image information at parts corresponding to the small defects will be lost in a visible image reproduced from an image signal, which has been detected from the stimulable phosphor sheet. Additionally, patterns caused to occur in the radiation image by the small defects and information in the radiation image, which information is related to a diagnosis, or the like, cannot be discriminated from each other. Therefore, an accurate judgment, e.g. an accurate diagnosis of an illness, cannot be made from the visible image. (Both the small defects and dust clinging to the surface of a stimulable phosphor sheet will hereinbelow be referred to as "defects.")

SUMMARY OF THE INVENTION

The primary object of the present invention is to provide a radiation image read-out apparatus, which has a function for detecting the presence or absence and the location of dust clinging to a stimulable phosphor sheet.

Another object of the present invention is to provide a method for displaying a radiation image such that patterns caused to occur in the radiation image by defects, which are present on the surface or in the interior of a stimulable phosphor sheet, and patterns in the radiation image that are related to a diagnosis, or the like, can be discriminated from each other.

The specific object of the present invention is to provide a method for displaying a radiation image such that patterns caused to occur in the radiation image by defects, which are present on the surface or in the interior of a stimulable phosphor sheet, may be erased from a visible image.

The present invention provides a radiation image read-out apparatus comprising:

(i) a stimulating ray irradiating unit for irradiating stimulating rays to a stimulable phosphor sheet, on which a radiation image has been stored, the stimulating rays causing the stimulable phosphor sheet to emit light in proportion to the amount of energy stored thereon during its exposure to radiation, (ii) a first photoelectric conversion unit for photoelectrically detecting the emitted light, and thereby generating an image signal representing said radiation image, (iii) a second photoelectric conversion unit for photoelectrically detecting the stimulating rays, which have been reflected from the stimulable phosphor sheet, and thereby generating a monitor signal, and (iv) a detection unit for detecting location of a pattern caused to occur in the radiation image, which is represented by the image signal, by dust clinging to the stimulable phosphor sheet, the detection being based on said monitor signal.

As described above, when the stimulable phosphor sheet, on which a radiation image has been stored, is exposed to stimulating rays, it emits light in proportion to the amount of energy stored thereon during its exposure to radiation. The emitted light is photoelectrically detected, and an image signal representing the radiation image is thereby obtained. From the image signal, it is difficult for a discrimination to be made as to whether dust clung or did not cling to the stimulable phosphor sheet. Such a discrimination can be made by detecting the stimulating rays reflected from the stimulable phosphor sheet. In cases where dust clings to part of the stimulable phosphor sheet, the stimulating rays irradiated to said part are scattered or absorbed by the dust. Therefore, the radiation image read-out apparatus in accordance with the present invention is provided with the second photoelectric conversion unit for photoelectrically detecting the stimulating rays, which have been reflected from the stimulable phosphor sheet, and thereby generating a monitor signal. The radiation image read-out apparatus in accordance with the present invention is also provided with the detection unit. From the monitor signal, the detection unit detects the presence or absence and the location of a pattern, which is caused to occur in the radiation image by dust clinging to the stimulable phosphor sheet. Specifically, the presence or absence and the location of a pattern, which is caused to occur in the radiation image by dust clinging to the stimulable phosphor sheet, is detected from a change in the amount of the stimulating rays, which have been reflected by the stimulable phosphor sheet and impinge upon the second photoelectric conversion unit.

Therefore, with the radiation image read-out apparatus in accordance with the present invention, a pattern caused to occur by dust and image information that is related to a diagnosis, or the like, can be discriminated from each other. Accordingly, an accurate judgment, in particular, an accurate diagnosis of an illness, can be made from the visible image reproduced from the image signal.

The present invention also provides a first method for displaying a radiation image in which a visible image reproduced from an image signal is displayed, the image signal having been obtained by exposing a stimulable phosphor sheet, on which the radiation image has been stored, to stimulating rays, which cause the stimulable phosphor sheet to emit light in proportion to the amount of energy stored thereon during its exposure to radiation, the emitted light being detected, the method comprising the steps of:

(i) obtaining a specific pattern location signal, which represents the location of a specific pattern appearing in the radiation image represented by the image signal, the specific pattern being caused to occur by a defect, which is present on the surface or in the interior of the stimulable phosphor sheet, (ii) putting a mark, which indicates the specific pattern, on the visible image reproduced from the image signal, and (iii) displaying the visible image.

In the first method for displaying a radiation image in accordance with the present invention, no limitation is imposed on how the specific pattern location signal is obtained. By way of example, the specific pattern location signal may be obtained in the manner as that in embodiments, which will be described later.

With the first method for displaying a radiation image in accordance with the present invention, the specific pattern location signal is obtained, the mark indicating the specific pattern is put on the visible image, and the visible image is displayed. Therefore, patterns in the radiation image that are related to a diagnosis, or the like, and patterns caused to occur by defects, such as dust, can be discriminated from each other. Accordingly, an accurate judgment, in particular, an accurate diagnosis of an illness, can be made from the visible image.

The present invention further provides a second method for displaying a radiation image in which a visible image reproduced from an image signal is displayed, the image signal having been obtained by exposing a stimulable phosphor sheet, on which a radiation image has been stored, to stimulating rays, which cause the stimulable phosphor sheet to emit light in proportion to the amount of energy stored thereon during its exposure to radiation, the emitted light being detected, the method comprising the steps of:

(i) obtaining a specific pattern location signal, which represents the location of a specific pattern appearing in the radiation image represented by the image signal, the specific pattern being caused to occur by a defect, which is present on the surface or in the interior of the stimulable phosphor sheet, (ii) carrying out interpolating operations on image signal components of the image signal, the image signals components represent picture elements located around the specific pattern, the interpolated image signal components corresponding to the specific pattern being thereby obtained, (iii) replacing the image signal components of the image signal, which correspond to the specific pattern, by the interpolated image signal components, (iv) reproducing the visible image from the image signal, which is obtained from the replacement process, and (v) displaying the visible image thus reproduced.

In the second method for displaying a radiation image in accordance with the present invention, no limitation is imposed on how the specific pattern location signal is obtained. By way of example, the specific pattern location signal may be obtained in the manner as that in embodiments, which will be described later.

With the second method for displaying a radiation image in accordance with the present invention, the specific pattern location signal is obtained, and the interpolated image signal components corresponding to the specific pattern are obtained by carrying out interpolating operations on image signal components of the image signal, which image signal components represent picture elements located around the specific pattern. The image signal components of the image signal, which correspond to the specific pattern, are replaced by the interpolated image signal components. A visible image is then reproduced from the image signal, which is obtained from the replacement process, and displayed. Therefore, patterns caused to occur by defects are erased in the visible image, and the visible image representing only the image information that is related to a diagnosis, or the like, is displayed. Accordingly, an accurate judgment, in particular, an accurate diagnosis of an illness, can be made from the visible image.

DESCRIPTION OF THE PREFERRED EMBODIMENTS

The present invention will hereinbelow be described in further detail with reference to the accompanying drawings.

First, embodiments of the radiation image readout apparatus in accordance with the present invention will be described hereinbelow.

Figure 1:
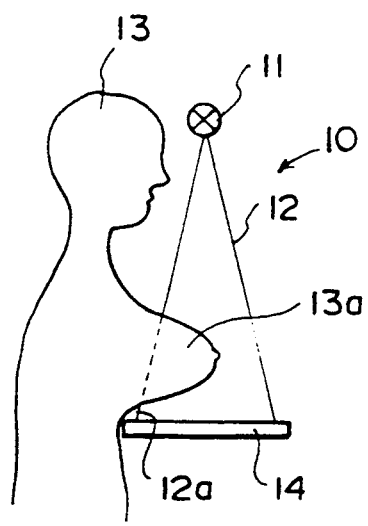
FIG. 1 is a schematic view showing an example of an X-ray image recording apparatus.

FIG. 1 is a schematic view showing an example of an X-ray image recording apparatus.

With reference to FIG. 1, X-rays 12 are produced by an X-ray source 11 of an X-ray image recording apparatus and irradiated to the mamma 13a of a human body 13. X-rays 12a, which have passed through the human body 13, impinge upon a stimulable phosphor sheet 14. In this manner, an X-ray image of the mamma 13a of the human body 13 is stored on the stimulable phosphor sheet 14.

Figure 2:
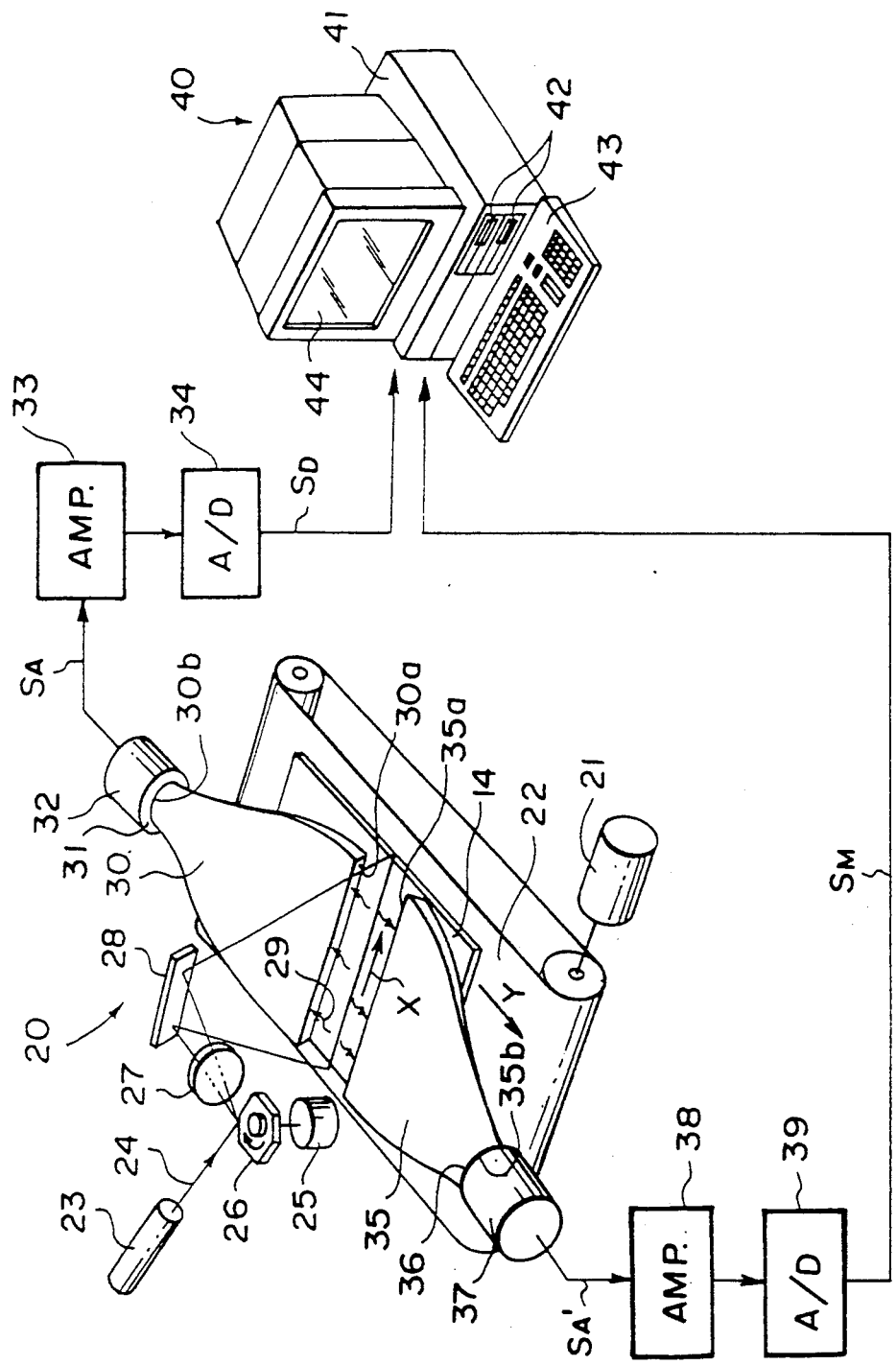
FIG. 2 is a perspective view showing an embodiment of the radiation image read-out apparatus in accordance with the present invention, which takes on the form of an X-ray image read-out apparatus.

FIG. 2 is a perspective view showing an embodiment of the radiation image read-out apparatus in accordance with the present invention, which takes on the form of an X-ray image read-out apparatus.

With reference to FIG. 2, a stimulable phosphor sheet 14, on which an X-ray image has been stored, is placed at a predetermined position in a read-out section 20. The stimulable phosphor sheet 14 is then conveyed in a sub-scanning direction indicated by the arrow Y by a sheet conveyance means 22, which is constituted of an endless belt or the like and which is operated by a motor 21. A laser beam 24, which serves as stimulating rays, is produced by a laser beam source 23, and is reflected and deflected by a rotating polygon mirror 26 which is quickly rotated by a motor 25 in the direction indicated by the arrow. The laser beam 24 then passes through a converging lens 27 constituted of an fφ lens or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 to its light output face 30b. The light guide member 30 is made from a light guiding material such as an acrylic plate and has a linear light input face 30a, positioned so that it extends along the main scanning line on the stimulable phosphor sheet 14, and the ring-shaped light output face 30b. The light output face 30b is coupled with a light receiving face of a photomultiplier 32. An optical filter 31 for transmitting only the emitted light 29 and filtering out the laser beam 24 is located between the light output face 30b and the light receiving face of the photomultiplier 32. The emitted light 29, which has entered the light guide member 30 at its light input face 30a, is guided through repeated total reflection inside of the light guide member 30, emanates from the light output face 30b, and is received by the photomultiplier 32 via the optical filter 31. In this manner, the amount of the emitted light 29, which amount represents the X-ray image, is converted into an electric signal by the photomultiplier 32.

An analog output signal SA generated by the photomultiplier 32 is logarithmically amplified by a logarithmic amplifier 33, and digitized by an A/D converter 34 into an electric image signal SD.

The image signal SD is then fed into a signal processing section 40. The signal processing section 40 is provided with an example of the detection unit of the radiation image read-out apparatus in accordance with the present invention. The signal processing section 40 comprises a main body 41 in which a CPU and an internal memory are incorporated, a disk drive unit 42 which operates a floppy disk serving as a subsidiary memory, a keyboard 43 from which necessary instructions, or the like, are fed into the signal processing section 40, and a CRT display device 44 which displays a visible image reproduced from the image signal SD and necessary information.

When necessary, for example, signal compression processing is carried out on the image signal SD, which has been fed into the signal processing section 40. An image signal obtained from the signal compression processing is then fed into an image filing apparatus (not shown), which stores radiation images in the form of image signals. Alternatively, the image signal SD is subjected to image processing, such as frequency emphasis processing, smoothing processing, or contrast transformation processing, and an image signal resulting from the image processing is used during the reproduction of a visible image on the CRT display device 44.

Figure 3:
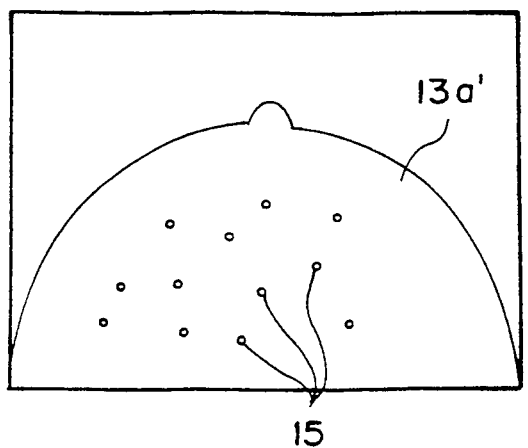
FIG. 3 is a schematic view showing an example of an X-ray image of the mamma reproduced and displayed on a CRT display device.

FIG. 3 is a schematic view showing an example of an X-ray image of the mamma reproduced and displayed on a CRT display device.

With reference to FIG. 3, dot-like patterns 15, 15, . . ., which are whiter than the surrounding areas and have a diameter of approximately 300 μm, appear in a mamma pattern 13a'. The white dot-like patterns 15, 15, are primarily caused to occur by calcified parts in the mamma. A mammary cancer may be diagnosed from the number, the density, or the like, of the white dot-like patterns 15, 15, . . . However, such white dot-like patterns 15, 15, . . . are also caused to occur by dust clinging to the stimulable phosphor sheet 14. If the white dot-like patterns 15, 15, 15, . . . , which are caused to occur by calcified parts in the mamma, and the white dot-like patterns 15, 15, . . . , which are caused to occur by dust clinging to the stimulable phosphor sheet 14, cannot be discriminated from each other, an accurate diagnosis cannot be made. Therefore, the read-out section 20 of the X-ray image read-out apparatus shown in FIG. 2 is provided with a second photoelectric conversion unit, which is constituted of a light guide member 35, a photomultiplier 37, and the like.

During the image read-out operation described above, part of the laser beam 24 irradiated to the stimulable phosphor sheet 14 is reflected therefrom. The reflected laser beam 24 enters the light guide member 35 from its light input face 35a, is guided inside of the light guide member 35, and emanates from a light output face 35b. The reflected laser beam 24 then passes through an optical filter 36 for transmitting only the laser beam 24 and filtering out the light 29 emitted by the stimulable phosphor sheet 14, and impinges upon the photomultiplier 37. An analog signal SA' is thereby generated by the photomultiplier 37. The analog signal SA' is logarithmically amplified by a logarithmic amplifier 38, and digitized by an A/D converter 39. The digital signal thus obtained is fed as a monitor signal SM into the image processing section 40. In the image processing section 40, the presence or absence and the location of a pattern caused to occur by dust clinging to the stimulable phosphor sheet 14 are detected in the manner described below.

Figure 4:
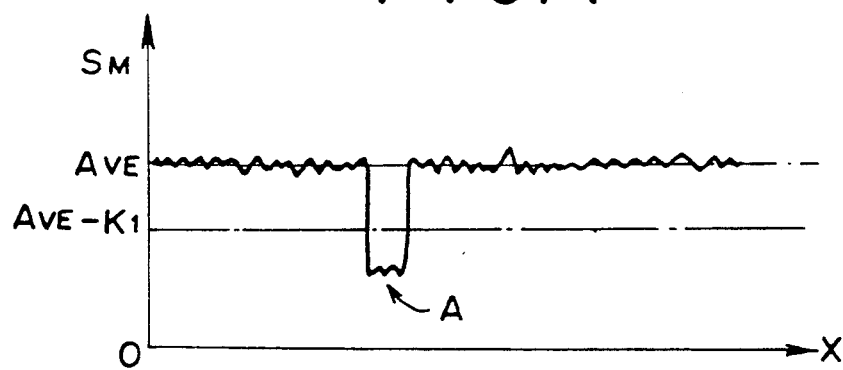
FIG. 4 is a graph showing the distribution of components of a monitor signal SM, which correspond to positions located along a main scanning direction (the direction indicated by the arrow X in FIG. 2)

FIG. 4 is a graph showing the distribution of components of a monitor signal SM, which correspond to positions located along a main scanning direction (the direction indicated by the arrow X in FIG. 2).

During the image read-out operation, the amount of the laser beam 24 irradiated to the stimulable phosphor sheet 14 is kept constance and does not change with the passage of time. Therefore, ordinarily, the amount of the laser beam 24, which is reflected from the stimulable phosphor sheet 14 and enters the light guide member 35, is also approximately constant and kept at a level, Ave. In cases where dust clings to the surface of the stimulable phosphor sheet 14, the laser beam 24 irradiated to the stimulable phosphor sheet 14 is scattered or absorbed by the dust, and the amount of the laser beam 24 entering the light guide member 35 becomes small. Therefore, as indicated by A in FIG. 4, the value of the monitor signal SM decreases. Accordingly, components of the monitor signal SM, whose values are smaller than a predetermined threshold value, Ave-Kl, are detected for each main scanning line.

Figure 5:
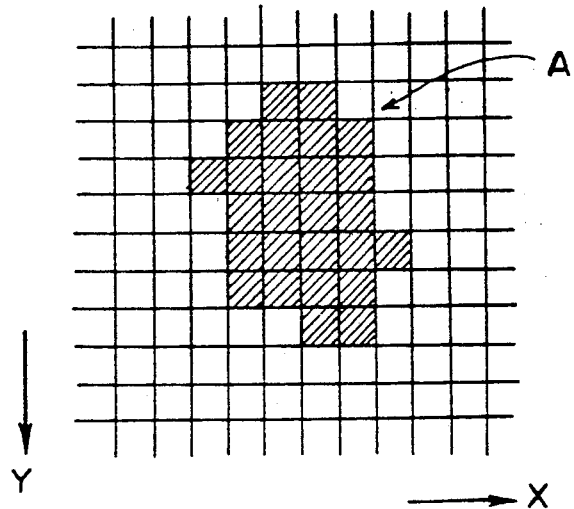
FIG. 5 is an explanatory view showing picture elements at part of an X-ray image stored on a stimulable phosphor sheet.

FIG. 5 is an explanatory view showing picture elements at part of an X-ray image stored on the stimulable phosphor sheet 14.

As described above, the values of the components of the monitor signal SM, which correspond to positions located along each main scanning line, are compared with the threshold value, Ave-Kl. Thereafter, a region composed of the picture elements in the X-ray image, which are associated with the components of the monitor signal SM, whose values are smaller than the predetermined threshold value, Ave-K1, is found as corresponding to a pattern caused to occur by dust clinging to the stimulable phosphor sheet 14. In FIG. 5, such a region is hatched.

After the pattern caused to occur by dust clinging to the stimulable phosphor sheet 14 is detected in the manner described above, the pattern is indicated as being caused to occur by dust in a visible image, which is reproduced from the image signal SD and displayed. Therefore, the patterns corresponding to calcified parts and the patterns caused to occur by dust can be discriminated from each other in the visible image, and an accurate diagnosis can be made from the visible image.

Figure 6:
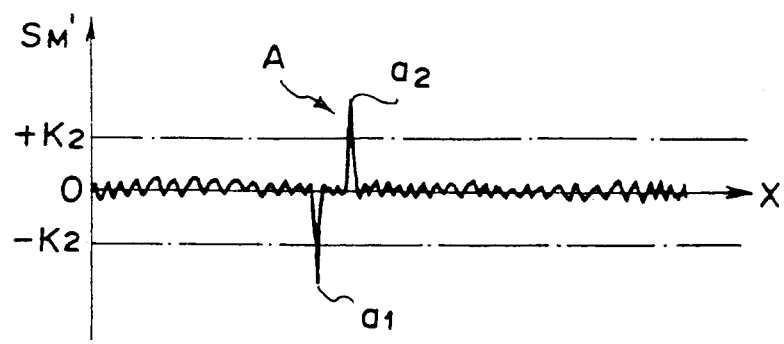
FIG. 6 is a graph showing the distribution of differentiated values SM′, which are obtained from the carrying out of differentiation processing on the components of the monitor signal SM corresponding to positions located along a main scanning direction (the direction indicated by the arrow X in FIG. 2), the graph serving as an aid in explaining a different example of how a region on a stimulable phosphor sheet, to which dust clings, is found.

FIG. 6 is a graph showing the distribution of differentiated values SM', which are obtained from the carrying out of differentiation processing on the components of the monitor signal SM corresponding to positions located along a main scanning direction (the direction indicated by the arrow X in FIG. 2). The graph serves as an aid in explaining a different example of how a region on a stimulable phosphor sheet, to which dust clings, is found.

When differentiation processing is carried out on the components of the monitor signal SM corresponding to positions located along the direction indicated by the arrow X in FIG. 6, a downward peak, a1, occurs at the front edge of the part A corresponding to a pattern caused to occur by dust, and an upward peak, a2, occurs at the rear edge of the part A. Therefore, the values of the peaks a1 and a2 are compared with threshold values -K2 and +K2. In this manner, the front edge and the rear edge of the region corresponding to the pattern caused to occur by dust can be found from the results of the comparison.

Figure 7:
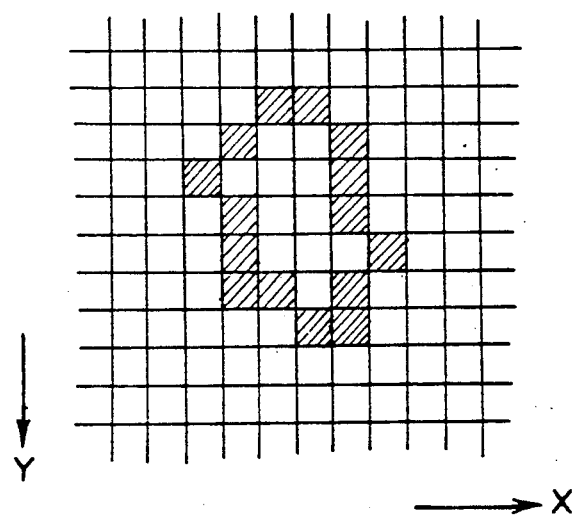
FIG. 7 is an explanatory view showing picture elements at part of an X-ray image stored on a stimulable phosphor sheet.

FIG. 7 is an explanatory view showing picture elements at part of an X-ray image stored on a stimulable phosphor sheet.

As described above, the front edge and the rear edge of the region corresponding to the pattern caused to occur by dust are found by carrying out the differentiation processing on the components of the monitor signal SM corresponding to positions located along each main scanning line in the direction indicated by the arrow X in FIG. 6. In such cases, by way of example, picture elements hatched in FIG. 7 are found as corresponding to the front edge and the rear edge of the region corresponding to the pattern caused to occur by dust. The region surrounded by the picture elements corresponding to the front edge and the rear edge is found as corresponding to a pattern caused to occur by dust.

Figure 8:
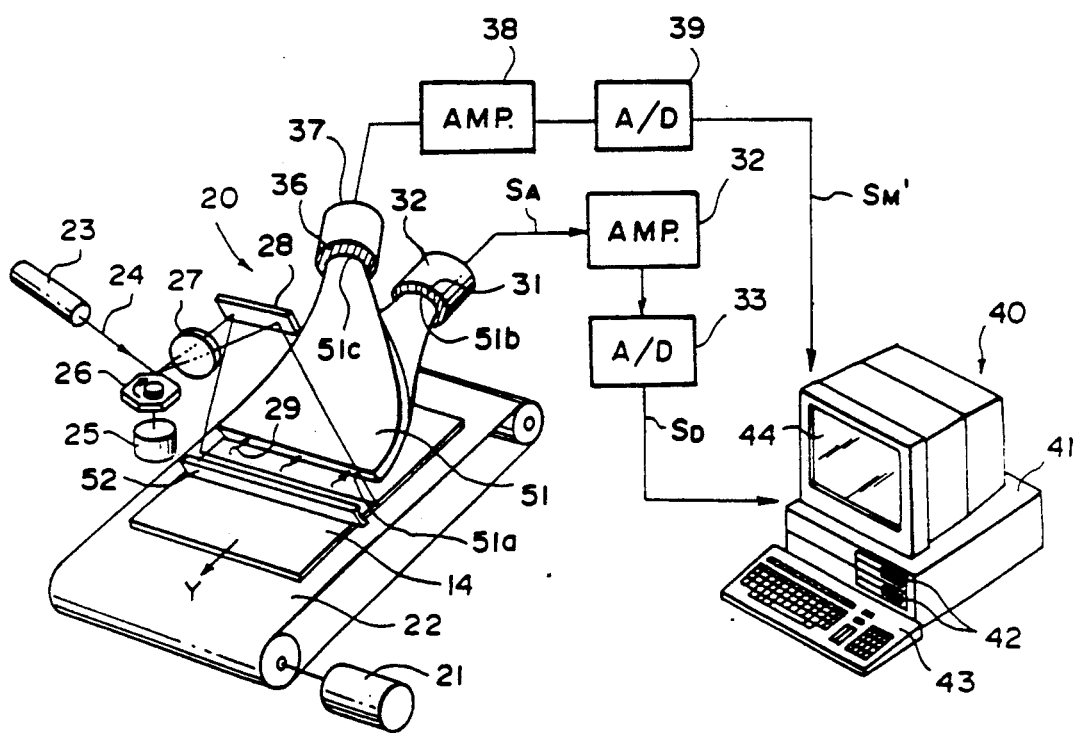
FIG. 8 is a perspective view showing another embodiment of the radiation image read-out apparatus in accordance with the present invention, which takes on the form of an X-ray image read-out apparatus.

FIG. 8 is a perspective view showing another embodiment of the radiation image read-out apparatus in accordance with the present invention, which takes on the form of an X-ray image read-out apparatus. In FIG. 8, similar elements are numbered with the same reference numerals with respect to FIG. 2.

With reference to FIG. 8, the X-ray image read-out apparatus is provided with a light guide member 51, which forks into two branches. Both the light 29 emitted by the stimulable phosphor sheet 14 and the laser beam 24 reflected from the surface of the stimulable phosphor sheet 14 enter a light input face 51a of the light guide member 51. A reflection mirror 52 is located facing the light input face 51a such that a main scanning line intervenes between the reflection mirror 52 and the light input face 51a. The light 29, which has been emitted by the stimulable phosphor sheet 14 toward the reflection mirror 52, and the laser beam 24, which has been reflected from the stimulable phosphor sheet 14 toward the reflection mirror 52, are reflected by the reflection mirror 52 to the light input face 51a.

The emitted light 29 and the reflected laser beam 24 are guided inside of the light guide member 51, divided into two branches, and emanate from a first light output face 51b and a second light output face 51c. The first light output face 51b is coupled with the photomultiplier 32. The optical filter 31 for transmitting only the emitted light 29 and filtering out the laser beam 24 is located between the first light output face 51b and the photomultiplier 32. Therefore, only the emitted light 29 is photoelectrically converted by the photomultiplier 32. The second light output face 51c is coupled with the photomultiplier 37. The optical filter 36 for transmitting only the laser beam 24 and filtering out the light 29 emitted by the stimulable phosphor sheet 14 is located between the second light output face 51c and the photo multiplier 37. Therefore, only the reflected laser beam 24 is photoelectrically converted by the photomultiplier 37. The analog signal generated by the photomultiplier 37 is logarithmically amplified by the logarithmic amplifier 38, and digitized by the A/D converter 39. In this manner, a monitor signal SM' is generated. The monitor signal SM' represents the amount of the reflected laser beam 24, and therefore ordinarily has a constant value. In cases where dust clings to the surface of the stimulable phosphor sheet 14, the laser beam 24 is scattered or absorbed by the dust. Therefore, the value of the monitor signal SM' decreases at part corresponding to the dust.

In the signal processing section 40, the presence or absence and the location of a pattern caused to occur by dust clinging to the stimulable phosphor sheet 14 are detected from the monitor signal SM'.

In the aforesaid embodiments of the radiation image read-out apparatus in accordance with the present invention, the X-ray image of the mamma of a human body is read out. The radiation image read-out apparatus in accordance with the present invention is not limited to the readout of the image of the mamma of a human body nor to the readout of an X-ray image, but may be used widely. For example, the radiation image read-out apparatus in accordance with the present invention is also applicable when an electron beam image, which has been stored on a stimulable phosphor sheet, is read out in an electron microscope systems, or the like.

Embodiments of the method for displaying a radiation image in accordance with the present invention will be described hereinbelow.

Figure 9:
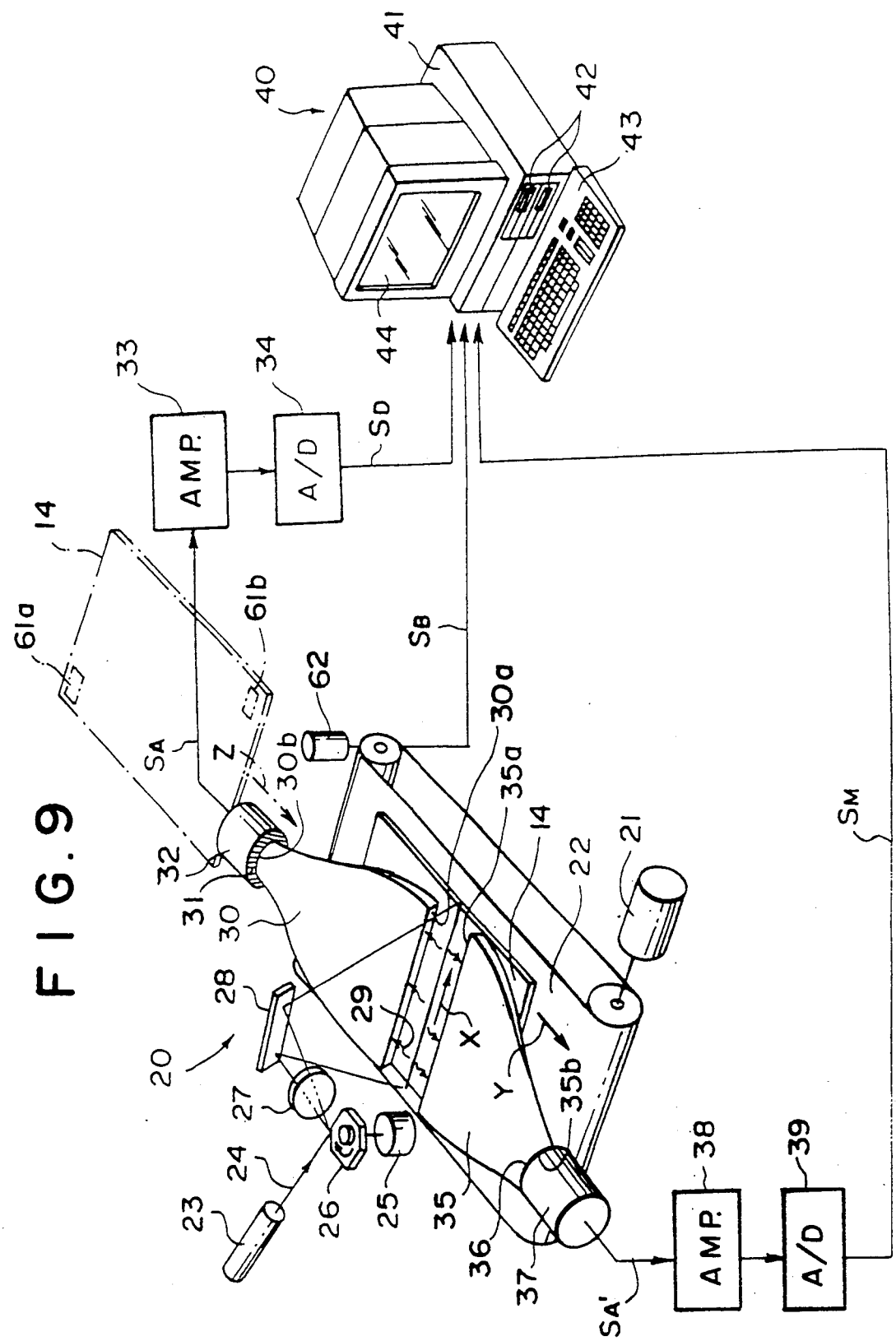
FIG. 9 is a perspective view showing an example of an X-ray image read-out apparatus.

FIG. 9 is a perspective view showing an example of an X-ray image read-out apparatus. In FIG. 9, similar elements are numbered with the same reference numerals with respect to FIG. 2. After the X-ray image of the mamma is stored on the stimulable phosphor sheet 14 in the X-ray image recording apparatus shown in FIG. 1, it is read out in the same manner as that described above in the X-ray image read-out apparatus shown in FIG. 9.

In FIG. 9, the read-out section 20 is provided with a bar code reader 62. Before the stimulable phosphor sheet 14 is set at the read-out section 20, a bar code 61a or a bar code 61b attached to the stimulable phosphor sheet 14 is read by the bar code reader 62 as will be described later in detail. The bar code 61a or the bar code 61b is attached to the rear surface of the stimulable phosphor sheet 14.

Figure 10:
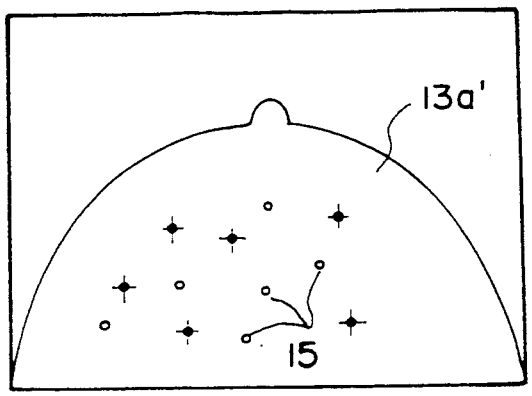
FIG. 10 is a schematic view showing an example of an X-ray image of the mamma reproduced and displayed on a CRT display device.

FIG. 10 is a schematic view showing an example of an X-ray image of the mamma reproduced and displayed on a CRT display device.

With reference to FIG. 10, dot-like patterns 15, 15, ..., which are whiter than the surrounding areas and have a diameter of approximately 300 μm, appear in a mamma pattern 13a'. The "+" marks shown in FIG. 10 will be described later in detail. The white dot-like patterns 15, 15, ... are primarily caused to occur by calcified parts in the mamma. A mammary cancer may be diagnosed from the number, the density, or the like, of the white dot-like patterns 15, 15, ... However, such white dot-like patterns 15, 15, ... are also caused to occur in the X-ray image by defects, which are present on the surface or in the interior of the stimulable phosphor sheet 14. If the white dot-like patterns 15, 15, ..., which are caused to occur by calcified parts in the mamma, and the white dot-like patterns 15, 15, ..., which are caused to occur by defects, which are present on the surface or in the interior of the stimulable phosphor sheet 14, cannot be discriminated from each other, an accurate diagnosis cannot be made.

Therefore, in this embodiment, before the X-ray image of the mamma is recorded and read out, preparations are carried out in the manner described below, and the presence or absence and the location of a pattern caused to occur by a defect, which is present on the surface or in the interior of the stimulable phosphor sheet 14 and which cannot be eliminated by cleaning, or the like, are thereby found. Also, during the image read-out operation, a monitor signal SM is generated by the second photoelectric conversion unit which is located at the read-out section 20 of the X-ray image read-out apparatus shown in FIG. 9 and which is constituted of the light guide member 35, the photomultiplier 37, and the like. From the monitor signal SM, the presence or absence and the location of a pattern caused to occur by a defect (e.g. dust clinging to the surface of the stimulable phosphor sheet 14), which is inherent to the image recording and read-out operations and which can be eliminated by cleaning, or the like, are detected.

Figure 11:
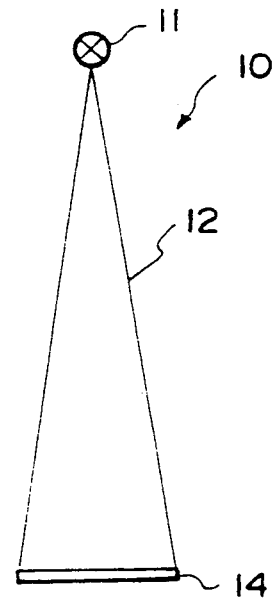
FIG. 11 is a schematic view showing an example of an X-ray image recording apparatus.

FIG. 11 is a schematic view showing an example of an X-ray image recording apparatus.

With reference to FIG. 11, the X-ray source 11 and the stimulable phosphor sheet 14 are spaced as far apart from each other as possible. No object, or the like, is placed between the X-ray source 11 and the stimulable phosphor sheet 14, and the X-rays 12 are irradiated directly to the stimulable phosphor sheet 14. In this manner, the whole surface of the stimulable phosphor sheet 14 is uniformly exposed to the X-rays 12. Specifically, a uniformly exposed image is stored on the stimulable phosphor sheet 14.

After the uniformly exposed image is stored on the stimulable phosphor sheet 14, the stimulable phosphor sheet 14 is set at a predetermined position in the readout section 20 of the X-ray image read-out apparatus shown in FIG. 9. By carrying out an image read-out operation in the same manner as that described above, and an image signal SD is thereby obtained. The image signal SD is then fed into the image processing section 40. The image signal SD represents the uniformly exposed image. In the signal processing section 40, the presence or absence and the location of a pattern caused to occur by a defect, which is present on the surface or in the interior of the stimulable phosphor sheet 14, are detected in the manner described below.

Figure 12:
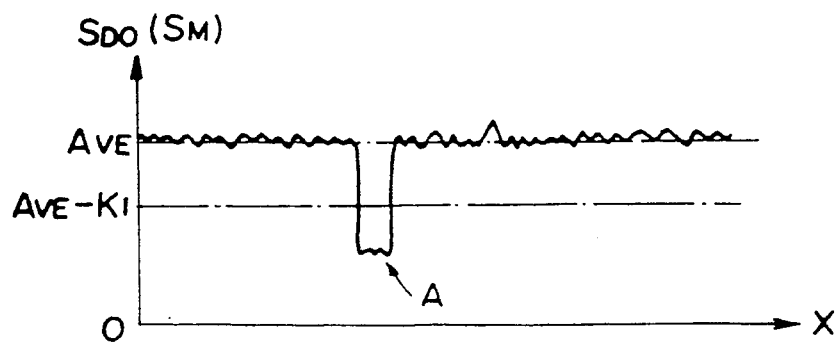
FIG. 12 is a graph showing the distribution of components of a uniformly exposed image signal SDO, which correspond to positions located along a main scanning direction (the direction indicated by the arrow X in FIG. 9)

FIG. 12 is a graph showing the distribution of components of a uniformly exposed image signal SDO, which correspond to positions located along a main scanning direction (the direction indicated by the arrow X in FIG. 9).

As described above, the uniformly exposed image signal SDO represents the uniformly exposed image stored on the stimulable phosphor sheet 14. Therefore, ordinarily, the uniformly exposed image signal SDO has an approximately constant value (Ave) over the whole surface of the stimulable phosphor sheet 14. In cases where a defect is present on the surface or in the interior of the stimulable phosphor sheet 14, the amount of light emitted by the part, at which the defect is present, becomes smaller than the amount of light emitted by the other parts of the stimulable phosphor sheet 14. Therefore, as indicated by A in FIG. 12, the value of the uniformly exposed image signal SDO decreases. Accordingly, components of the uniformly exposed image signal SDO, whose values are smaller than a predetermined threshold value, Ave-Kl, are detected for each main scanning line.

By way of example, picture elements at part of the uniformly exposed image stored on the stimulable phosphor sheet 14 may be located as illustrated in FIG. 5.

As described above, the values of the components of the uniformly exposed image signal SDO, which correspond to positions located along each main scanning line, are compared with the threshold value, Ave-Kl. Thereafter, a region composed of the picture elements in the uniformly exposed image, which are associated with the components of the uniformly exposed image signal SDO, whose values are smaller than the predetermined threshold value, Ave-Kl, is found as corresponding to a pattern caused to occur by a defect of the stimulable phosphor sheet 14. In FIG. 5, such a region is hatched.

Figure 13:
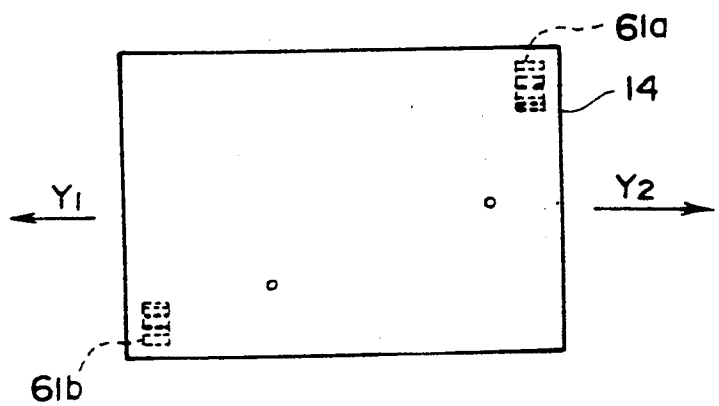
FIG. 13 is a schematic view showing a stimulable phosphor sheet.

FIG. 13 is a schematic view showing a stimulable phosphor sheet. In FIG. 13, small circles indicate the locations of defects of the stimulable phosphor sheet 14.

In the manner described above, the presence or absence and the location of a pattern caused to occur by a defect of the stimulable phosphor sheet 14 are detected. Thereafter, information representing the relationship between the bar codes 61a and 61b, which are attached to the rear surface of the stimulable phosphor sheet 14, and the location of the pattern caused to occur by the defect is stored in the signal processing section 40.

The stimulable phosphor sheet 14 is conveyed in the sub-scanning direction indicated by the arrow Y1 or the arrow Y2 in FIG. 13 in accordance with the orientation in which the stimulable phosphor sheet 14 is set in the X-ray image read-out apparatus shown in FIG. 9. The location of the pattern caused to occur by the defect of the stimulable phosphor sheet 14 varies in accordance with whether the stimulable phosphor sheet 14 is conveyed in the sub-scanning direction indicated by the arrow Y1 or the arrow Y2. Therefore, the bar codes 61a and 61b representing different information are attached to the stimulable phosphor sheet 14. In cases where the stimulable phosphor sheet 14 is conveyed in the sub-scanning direction indicated by the arrow Y1, the bar code 61b is read by the bar code reader 62 shown in FIG. 9. In cases where the stimulable phosphor sheet 14 is conveyed in the sub-scanning direction indicated by the arrow Y2, the bar code 61a is read by the bar code reader 62. The bar code reader 62 generates a bar code signal SB, and the direction in which the stimulable phosphor sheet 14 is conveyed is detected from the bar code signal SB. Also, the location of the pattern caused to occur by the defect of the stimulable phosphor sheet 14 is found in accordance with the direction in which the stimulable phosphor sheet 14 is conveyed.

Thereafter, in the course of reading out the X-ray image of the mamma stored on the stimulable phosphor sheet 14, a monitor signal SM is generated by the A/D converter 39 of the second photoelectric conversion unit. From the monitor signal SM, the presence or absence and the location of a pattern caused to occur by a defect (e.g. dust clinging to the surface of the stimulable phosphor sheet 14), which can be eliminated by cleaning, or the like, are detected. The detection is carried out in the same manner as that described above with reference to FIGS. 4 and 5.

In this embodiment, the presence or absence and the location of a pattern caused to occur by a defect, which is present on the surface or in the interior of the stimulable phosphor sheet 14 and which cannot be eliminating by cleaning, or the like, can be found from the bar code signal SB. Also, the presence or absence and the location of a pattern caused to occur by a defect (e.g. dust clinging to the surface of the stimulable phosphor sheet 14), which is inherent to the image recording and read-out operations and which can be eliminating by cleaning, or the like, can be detected from the monitor signal SM. Therefore, in this embodiment, the bar code signal SB and the monitor signal SM correspond to the specific pattern location signal in the method for displaying a radiation image in accordance with the present invention.

The "+? marks illustrated in FIG. 10 indicate the specific patterns which have been detected in the manner described above. When the X-ray image of the mamma is reproduced and displayed as a visible image on the CRT display device 44, the specific patterns are indicated by the "+" marks as illustrated in FIG. 10. Therefore, the white dot-like patterns 15, 15, ..., which are caused to occur in the visible image by calcified parts in the mamma, and the white dot-like patterns 15, 15, ..., which are caused to occur in the visible image by defects, such as dust, can be discriminated from each other. Accordingly, an accurate diagnosis can be made from the visible image.

The "+" marks indicating the specific patterns may be displayed always during the normal operations, or may be displayed only when an instruction is given by an operator from the keyboard 43.

Also, instead of the visible image being displayed on the CRT display device 44, a visible image may be reproduced on photographic film, and marks may be put on the reproduced visible image.

Figure 14:
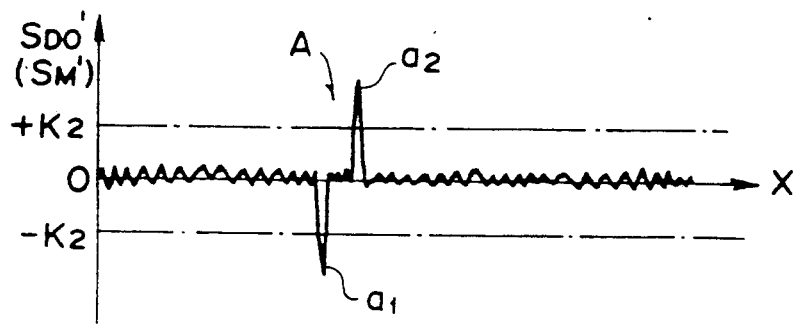
FIG. 14 is a graph showing the distribution of differentiated values SDO′ or differentiated values SM′, which are obtained from the carrying out of differentiation processing on the components of the uniformly exposed image signal SDO or the monitor signal SM corresponding to positions located along the main scanning direction (the direction indicated by the arrow X), the graph serving as an aid in explaining a different example of how the presence or absence and the location of a pattern caused to occur in a radiation image by a defect, which is present on the surface or in the interior of a stimulable phosphor sheet, are found.

FIG. 14 is a graph showing the distribution of differentiated values SDO' or differentiated values SM', which are obtained from the carrying out of differentiation processing on the components of the uniformly exposed image signal SDO or the monitor signal SM corresponding to positions located along the main scanning direction (the direction indicated by the arrow X). The graph serves as an aid in explaining a different example of how the presence or absence and the location of a pattern caused to occur in a radiation image by a defect, which is present on the surface or in the interior of a stimulable phosphor sheet, are found.

When differentiation processing is carried out on the components of the uniformly exposed image signal SDO (or the monitor signal SM) corresponding to positions located along the direction indicated by the arrow X in FIG. 14, a downward peak, a1, occurs at the front edge of the part A corresponding to a pattern caused to occur by a defect, and an upward peak, a2, occurs at the rear edge of the part A. Therefore, the values of the peaks a1 and a2 are compared with threshold values $=-K2$ and $+K2$. In this manner, the front edge and the rear edge of the region corresponding to the pattern caused to occur by a defect can be found from the results of the comparison.

As described above, the front edge and the rear edge of the region corresponding to the pattern caused to occur by a defect are found by carrying out the differentiation processing on the components of the uniformly exposed image signal SDO (or the monitor signal SM) corresponding to positions located along each main scanning line in the direction indicated by the arrow X in FIG. 14. In such cases, by way of example, picture elements hatched in FIG. 7 are found as corresponding to the front edge and the rear edge of the region corresponding to the pattern caused to occur by a defect. The region surrounded by the picture elements corresponding to the front edge and the rear edge is found as corresponding to a pattern caused to occur by a defect.

In the embodiment described above, the "+" marks are used to indicate the specific patterns. Any of other marks, e.g. arrows, may be employed for this purpose. Alternatively, in cases where a color CRT display device is used, the specific patterns may be indicated by a color different from the surrounding areas.

Another embodiment of the method for displaying a radiation image in accordance with the present invention will be described hereinbelow.

In this embodiment, in the same manner as that in the aforesaid embodiment of the method for displaying a radiation image in accordance with the present invention, the presence or absence and the location of a pattern caused to occur by a defect, which is present on the surface or in the interior of the stimulable phosphor sheet 14 and which cannot be eliminated by cleaning, or the like, are found from the bar code signal SB. Also, in the same manner as that described above, the presence or absence and the location of a pattern caused to occur by a defect (e.g. dust clinging to the surface of the stimulable phosphor sheet 14), which is inherent to the image recording and read-out operations and which can be eliminated by cleaning, or the like, are detected from the monitor signal SM.

Figure 16:
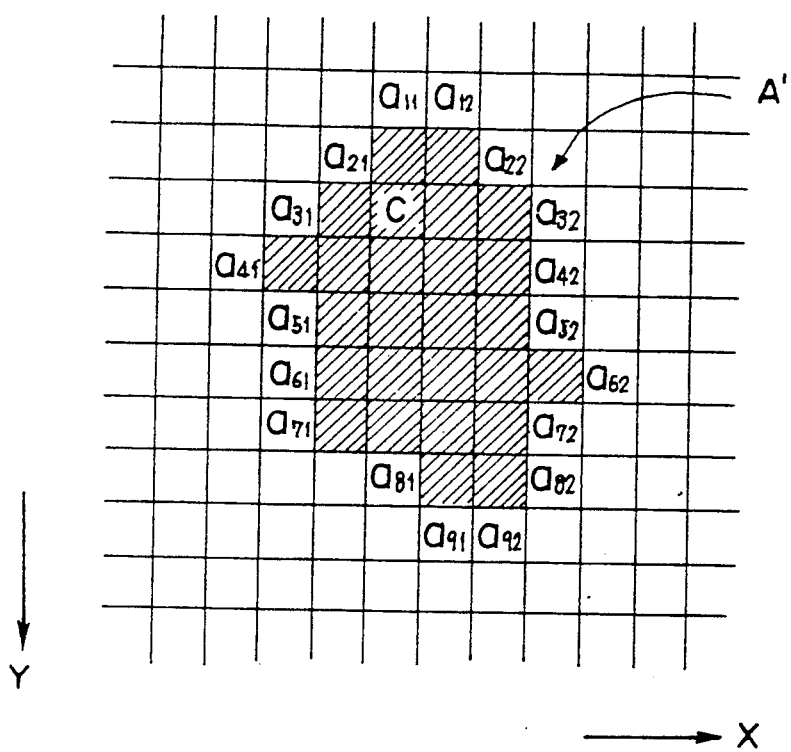
FIG. 16 is an explanatory view showing picture elements at part of an X-ray image of the mamma represented by an image signal SD.

FIG. 16 is an explanatory view showing picture elements at part of an X-ray image of the mamma represented by an image signal SD.

With reference to FIG. 16, the hatched region correspond to the pattern, which is caused to occur by a defect of the stimulable phosphor sheet 14 and which has been found in the manner described above. Therefore, the image signal components of the image signal SD corresponding to the picture elements falling within the hatched region do not correctly represent the image information. The image signal components of the image signal SD corresponding to the picture elements located around the hatched region are represented by aij, where $i=1, 2, \ldots, 9$ and $j=1, 2$.

After the image signal SD representing the X-ray image of the mamma is fed into the signal processing section 40, the region (the region A' in FIG. 16) corresponding to the pattern caused to occur by a defect is found from the bar code signal SB or the monitor signal SM. Thereafter, interpolating operations are carried out on the image signal components aij corresponding to the picture elements located around the region A'. From the interpolating operations, interpolated image signal components, ac, corresponding to the picture elements located in the region A' are obtained. No limitation is imposed on how the interpolating operations are carried out. For example, the mean value, aav, of the values of the image signal components aij corresponding to the picture elements located around the region A' may be calculated with the formula $$a_{av} = \sum_{i=1}^{9} \sum_{j=1}^{2} a_{ij}/18 \quad (1)$$

The mean value, aav, thus calculated may be employed as the values of the interpolated image signal components, ac, corresponding to all picture elements located in the region A'.

Alternatively, interpolating operations using equations of the first order may be carried out on the image signal components corresponding to the picture elements located along the main scanning direction (i.e. the direction indicated by the arrow X in FIG. 9 or FIG. 16). For example, the value of an interpolated image signal component, ax, corresponding to the picture element C may be calculated with the formula $$a_x = \frac{3 \cdot a_{31} + 2 \cdot a_{32}}{5} \quad (2)$$

As another alternative, interpolating operations using equations of the first order may be carried out on the image signal components corresponding to the picture elements located along the main scanning direction indicated by the arrow X. Also, interpolating operations using equations of the first order may be carried out on the image signal components corresponding to the picture elements located along the sub-scanning direction indicated by the arrow Y. The mean value of the values thus interpolated may be employed. For example, the value of the interpolated image signal component, ax, with respect to the main scanning direction is calculated with Formula (2). Also, the value of the interpolated image signal component, ay, with respect to the sub-scanning direction is calculated with Formula (3)

$$a_y = \frac{5 \cdot a_{11} + 2 \cdot a_{81}}{7} \quad (3)$$

Thereafter, the mean value of the values of the interpolated image signal components, ax and ay, is calculated with the formula $$a_c = \frac{a_x + a_y}{2} \quad (4)$$

The mean value thus obtained is employed as the value of the interpolated image signal component, ac, corresponding to the picture element C.

As a further alternative, interpolating operations using equations of a high order may be carried out.

After the interpolated image signal components are obtained in the manner described above, the image signal components of the original image signal SD, which represent the picture elements located in the region corresponding to the pattern caused to occur by a defect, are replaced by the interpolated image signal components.

Figure 15:
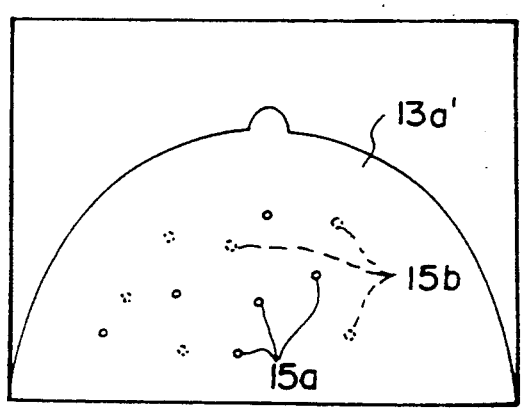
FIG. 15 is a schematic view showing an example of an X-ray image of the mamma reproduced and displayed on a CRT display device.

White dot-like patterns 15b, 15b, . . . illustrated in FIG. 15 correspond to the specific patterns, which have been found in the manner described above. When the X-ray image of the mamma is reproduced and displayed as a visible image on the CRT display device 44, a visible image is reproduced from an image signal, which has been obtained from the aforesaid replacement by the interpolated image signal components. In this manner, a visible image can be obtained, in which only the white dot-like patterns 15, 15, . . . corresponding to calcified parts are shown. Therefore, an accurate diagnosis can be made from the visible image.

The white dot-like patterns 15b, 15b, . . . caused to occur by defects may be erased always during normal operations, or may be erased only when an instruction is given by the operator from the keyboard 43.

Also, instead of the visible image being displayed on the CRT display device 44, a visible image may be reproduced on photographic film such that white dot-like patterns caused to occur by defects may be erased.

In the aforesaid embodiments of the method for displaying a radiation image in accordance with the present invention, the X-ray image read-out apparatus shown in FIG. 9 is used. The method for displaying a radiation image in accordance with the present invention is also applicable when any on various other read-out apparatuses is employed.

In the aforesaid embodiments of the method for displaying a radiation image in accordance with the present invention, the X-ray image of the mamma of a human body is reproduced and displayed. The method for displaying a radiation image in accordance with the present invention is not limited to the display of the image of the mamma of a human body nor to the display of an X-ray image, but may be used widely. For example, the method for displaying a radiation image in accordance with the present invention is also applicable when an electron beam image, which has been stored on a stimulable phosphor sheet, is read out, reproduced, and displayed in an electron microscope systems, or the like.

I claim:

1. A radiation image read-out apparatus, comprising:
   stimulating ray irradiating means for irradiating stimulating rays to a stimulable phosphor sheets, on which a radiation image has been stored, said stimulating rays causing said stimulable phosphor sheet to emit light in proportion to the amount of energy stored thereon during its exposure to radiation,
   first photoelectric conversion means for photoelectrically detecting the emitted light, and thereby generating an image signal representing said radiation image,
   second photoelectric conversion means for photoelectrically detecting the stimulating rays, which have been reflected from said stimulable phosphor sheet, and thereby generating a monitor signal, and
   detection means for detecting location of a pattern caused to occur in said radiation image, which is represented by said image signal, by dust clinging to said stimulable phosphor sheet, the detection being based on said monitor signal,
   wherein said first photoelectric conversion means and said second photoelectric conversion means are combined together such that a single common light input part serves both as a light input part of said first photoelectric conversion means and a light input part of said second photoelectric conversion means.

2. An apparatus as defined in claim 1 wherein said stimulating rays are a laser beam.

3. An apparatus as defined in claim 1 wherein said stimulable phosphor sheet is two-dimensionally scanned with said stimulating rays.

4. An apparatus as defined in claim 1 wherein said detection means detects location of said pattern, which is caused to occur by dust, from differentiated values, which are obtained from the carrying out of differentiation processing on components of said monitor signal.

5. A method for displaying a radiation image in which a visible image reproduced from an image signal is displayed, said image signal having been obtained by exposing a stimulable phosphor sheet, on which a radiation image has been stored, to stimulating rays, which cause the stimulable phosphor sheet to emit light in proportion to the amount of energy stored thereon during its exposure to radiation, the emitted light being detected, said method comprising the steps of:

(i) obtaining a specific pattern location signal, which represents the location of a specific pattern appearing in the radiation image represented by said image signal, said specific pattern being caused to occur by a defect, which is present on the surface or in the interior of said stimulable phosphor sheet, (ii) putting a mark, which indicates said specific patter, on said visible image reproduced from said image signal, and (iii) displaying said visible image.

6. A method as defined in claim 5 wherein said radiation image is an X-ray image.

7. A method as defined in claim 5 wherein said stimulating rays are a laser beam.

8. A method as defined in claim 5 wherein said stimulable phosphor sheet is two-dimensionally scanned with said stimulating rays.

9. A method as defined in claim 5 wherein said obtaining comprises the steps of:

detecting the stimulating rays reflected from said stimulable phosphor sheet to produce a monitor signal; and detecting the location of said pattern based on said monitor signal.

* * * * *